US008556630B2

(12) United States Patent
Hackett

(10) Patent No.: US 8,556,630 B2
(45) Date of Patent: Oct. 15, 2013

(54) SYSTEM AND METHOD FOR HUMAN PHYSICAL AND BEHAVIORAL PROFILING

(76) Inventor: Zannah Hackett, Encinitas, CA (US)

( * ) Notice: Subject to any disclaimer, the term of this patent is extended or adjusted under 35 U.S.C. 154(b) by 1004 days.

(21) Appl. No.: 11/865,113

(22) Filed: Oct. 1, 2007

(65) Prior Publication Data

US 2008/0081320 A1    Apr. 3, 2008

Related U.S. Application Data

(60) Provisional application No. 60/827,662, filed on Sep. 29, 2006.

(51) Int. Cl.
*G09B 19/00* (2006.01)

(52) U.S. Cl.
USPC ........................................ 434/236; 434/238

(58) Field of Classification Search
USPC .................................................. 434/236–238
See application file for complete search history.

(56) References Cited

U.S. PATENT DOCUMENTS

| | | | | | |
|---|---|---|---|---|---|
| 3,603,593 | A | * | 9/1971 | Chew | 273/161 |
| 4,306,141 | A | * | 12/1981 | Bailey et al. | 235/78 R |
| 4,579,345 | A | * | 4/1986 | Covey | 273/243 |
| 4,779,870 | A | * | 10/1988 | Nichols | 273/161 |
| 5,692,750 | A | * | 12/1997 | Poole | 273/161 |
| 5,702,253 | A | * | 12/1997 | Bryce et al. | 434/236 |
| 5,775,695 | A | * | 7/1998 | Byers | 273/161 |
| 5,816,819 | A | * | 10/1998 | Rockburn | 434/106 |
| 7,050,988 | B2 | * | 5/2006 | Atcheson et al. | 705/10 |
| 7,083,415 | B2 | * | 8/2006 | D'Zmura | 434/106 |
| 7,357,638 | B2 | * | 4/2008 | D'Zmura | 434/106 |
| 2002/0160338 | A1 | * | 10/2002 | Yirmeyahu | 434/106 |
| 2003/0036043 | A1 | * | 2/2003 | Sullivan et al. | 434/236 |
| 2003/0043194 | A1 | * | 3/2003 | Lif | 345/764 |
| 2004/0063082 | A1 | * | 4/2004 | O'Donnell | 434/238 |
| 2005/0019733 | A1 | * | 1/2005 | Martin | 434/106 |
| 2005/0023753 | A1 | * | 2/2005 | Breinholt | 273/161 |
| 2005/0164152 | A1 | * | 7/2005 | Lawson | 434/322 |
| 2006/0003294 | A1 | * | 1/2006 | O'Brien | 434/106 |
| 2006/0210952 | A1 | * | 9/2006 | Toland | 434/106 |
| 2008/0081319 | A1 | * | 4/2008 | Dunlop | 434/106 |
| 2008/0081320 | A1 | * | 4/2008 | Hackett | 434/236 |
| 2009/0311654 | A1 | * | 12/2009 | Lopez | 434/238 |

* cited by examiner

*Primary Examiner* — Robert J Utama
(74) *Attorney, Agent, or Firm* — ARC IP Law, PC; Joseph J. Mayo

(57) ABSTRACT

A system and method for human physical and behavioral profiling. Provides profiles based on queries to at least one individual that include physical and behavioral questions. May suggest behavior modification for an individual or a compatibility assessment between two individuals may be generating using two individual's profiles. Embodiments of the invention break personality styles into six styles, "Saturn", "Mars", "Jovial", "Lunar", "Venusian", "Mercury" and "Solar". The styles may be determined by visual input or physical description queries of an individual and may be associated with the polarity values of "active", "passive", "+" or "−". The system further yields an alchemy type of "Gold", "Silver", "Copper" and "Lead" which further allows for compatibility checking. Furthermore, the system quantifies a key feature and co-feature for an individual and provides an energy center designation of "moving", "emotional", "instinctive" or "intellectual" which are compared between individuals for compatibility.

10 Claims, 9 Drawing Sheets

Figure 3
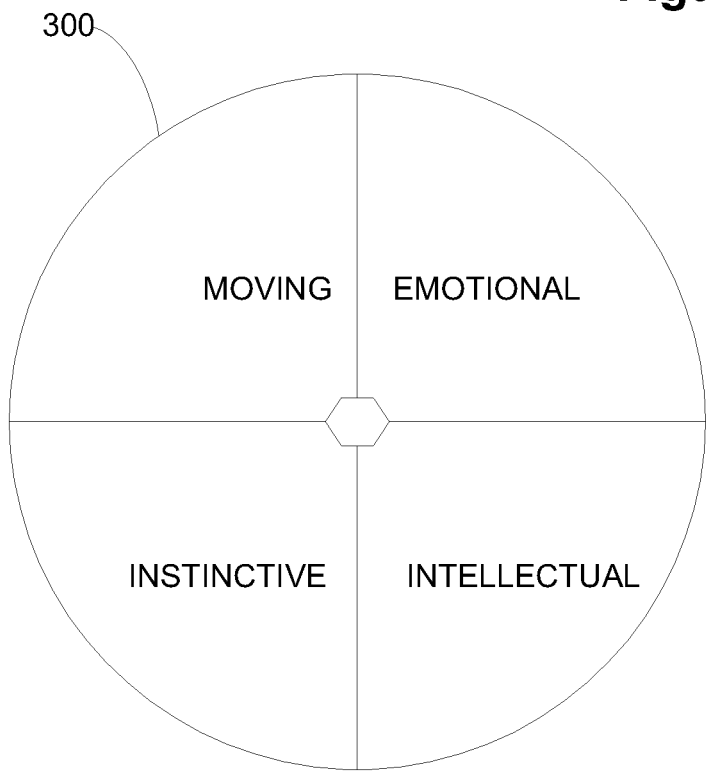
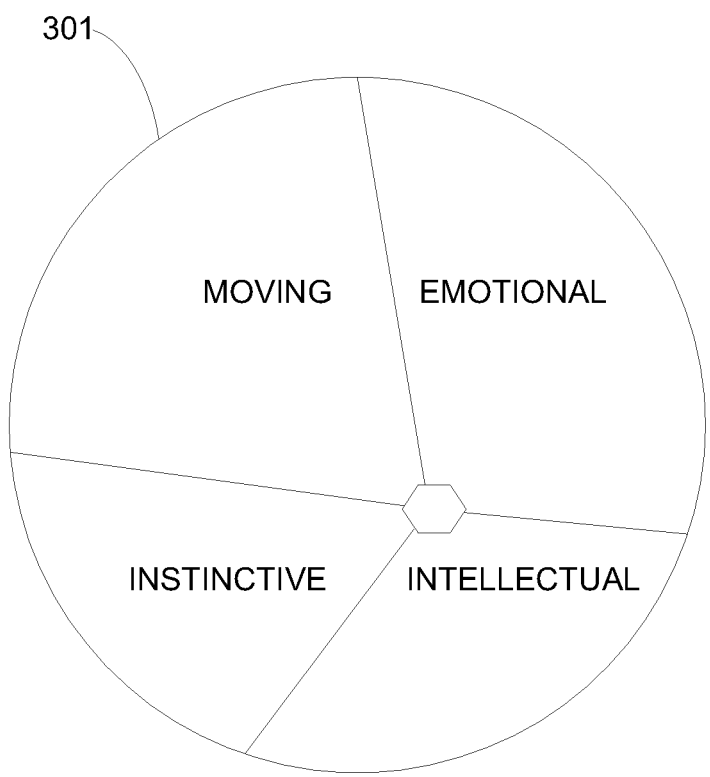

Survey Result grid.jpg

NAME
AGE
GENDER
TYPES

| Saturn | Mars | Jovial |
|---|---|---|
| 7 | 6 | 4 |
| Lunar | Venusian | Mercury |
| 1 | 3 | 4 |
| | Solar | |
| | 5 | |

Set Styles: Saturn | Mars | Solar

FEATURES

| Destructive | Dominance | Fear | Greed |
|---|---|---|---|
| 2 | 4 | 0 | 1 |
| Lunatic | Naivete | Non Existence | Power |
| 0 | 2 | 1 | 0 |
| Self Pity | Tramp | Vanity | Willfulness |
| 1 | 1 | 2 | 1 |

Set Features: Dominance

ENERGIES

| Emotional | Instinctual | Intellectual | Moving |
|---|---|---|---|
| 7 | 7 | 3 | 7 |

Set Energies: Moving | Emotional

ALCHEMY

| Gold | Silver | Copper |
|---|---|---|
| 4 | 2 | 1 |

Set Alchemy: Silver-Gold

POLARITY

| Positive Polarity | Polarity Negative |
|---|---|
| 19 | 11 |

Set Polarity: Positive

700

SYSTEM AND METHOD FOR HUMAN PHYSICAL AND BEHAVIORAL PROFILING

This application claims benefit of U.S. Provisional Patent Application Ser. No. 60/827,662 filed 29 Sep. 2006 the specification of which is hereby incorporated herein by reference.

BACKGROUND OF THE INVENTION

1. Field of the Invention

Embodiments of the invention described herein pertain to the field of computer systems. More particularly, but not by way of limitation, one or more embodiments of the invention enable a system and method for human physical and behavioral profiling.

2. Description of the Related Art

There are no known systems or methods for integrated profiling of both physical and behavior characteristics of humans. There are a number of ways to test the personality of an individual. The results of a test can aide the individual in understanding their thought processes and desires and are used in training, counseling, personal development and many other areas.

One method for determining personality types uses an Enneagram of Personality and involves 9 distinct personality types known as "enneatypes". This system does not involve or make use of physical law and others as they apply to physical characteristics and the manner in which they interface with the cycle of life and as such does not allow for match making compatibility to be conducted. This type of personality testing is utilized in Gurdjieff's Fourth Way tradition.

Another test that is commonly called a personality test is the Myers-Briggs Type Indicator test. The Myers-Briggs test results in measurements that allow for drastically different personalities to share common types and as such is not truly a "personality test". However, the test does sort for "dichotomies" that include "extroversion/introversion", "sensing/intuition", "thinking/feeling" and "judging/perceiving". The Myers-Briggs test results in 16 dichotomies that are generally abbreviated with the binary selection from each of the four dichotomies, e.g., "ENTP" for extroversion, iNtuition, Thinking and Perceiving. The current test is a binary choice test of nearly 100 questions. The results of the test indicate the dichotomy the participant prefers. The Myers-Briggs test does not involve or make use of an individual's physical characteristics and as such does not allow for match making compatibility to be conducted.

The "Big Five personality traits" is a psychological classification of personalities into five categories, emotional stability, extroversion, agreeableness, conscientiousness and openness to experience. The factors are five dimensions of personality discovered through empirical research. The five dimensions are found in virtually all personality tests. For example, the four dichotomy scales of Myers-Briggs test correlate well with the Big Five, except for emotional stability.

One of the main problems with the Fourth Way or Myers-Briggs tests is that a person that falls just on one side of a border yields a categorization that is different than a very similar person that happens to fall on the other side of a cutoff. In addition, the tests produce only 9 or 16 particular types with designations that are not easy for one to associate with. Furthermore, there is no indication given as to how compatible a particular designation is with another designation associated with another person since the physical characteristics are ignored by personality testing methodologies currently in use. For at least the limitations described above there is a need for a system and method for human physical and behavioral profiling that quantifies the physical and behavioral characteristics of persons to enable compatibility assessments between two individuals.

BRIEF SUMMARY OF THE INVENTION

One or more embodiments of the invention enable a system and method for human physical and behavioral profiling utilizing the laws of nature and objective understanding, meaning that which can be verified and/or seen with the naked eye. Embodiments of the invention categorize an individual's physical characteristics into seven styles, "Saturn", "Mars", "Jovial", "Lunar", "Venusian", "Mercury" and "Solar". These styles may be combined to form an overall style that includes percentages of at least one of these types. The styles may be chosen by visual input such as a photograph or physical descriptions of an individual for example. Each style may be associated with the activity values of "active" or "passive" and polarity values of "+", or "−" or optionally "neutral". For example, active and passive values relate to whether a style actively moves, speaks and performs actions or is conversely passive. The polarity values are utilized to designate the attraction and repulsion of the person. A positive style sees a cup as half full and a negative style sees a cup as half empty.

The system further yields an alchemy type of "Gold", "Silver", "Copper" and "Lead" based on querying an individual. Alchemy determines ones preferences toward oneself or others. This allows for a compatibility checking between people that utilize embodiments of the invention. Gold alchemy types are generally very fussy, meticulous, inflexible and highly refined. Silver alchemy types are neat, flexible, practical, solid, durable and adaptable. Copper alchemy types are tough, coarse, rugged and primitive. Lead alchemy types are messy, smelly, simple and financially poor. Incompatibility between two individuals is largely due to different alchemy types. A range of + or − one full type generally means that another individual falling into this range is compatible. Any other defined range that yields compatibility including percentage or neural network based correlations over time is in keeping with the spirit of the invention as one skilled in the art will recognize that +/−1 full type is not intended to be an absolute limit.

Furthermore, the system quantifies a key feature and co-feature for an individual based on querying an individual. The features that are generated based on an individual's answers are "vanity", "dominance", "power", "greed", "self pity", "fear", "non-existence", "naivete", "destructive", "lunatic", "tramp", and "willfulness". The key feature is the main feature of an individual and the co-feature is the relief feature that comes to the forefront when the main feature is not being asserted. The key feature may be thought of as the main driving force of an individual, i.e., what motivates an individual. If a co-feature is being asserted, then generally an individual may be under the influence of alcohol, drugs or some other external force which blocks the key feature. Embodiments of the invention allow for the identification of non-authentic assertion of features and allows for behavior modification.

Embodiments of the invention also provide an energy center designation of "moving", "emotional", "instinctive" or "intellectual" based on querying an individual. The moving center is designated when the individual is happiest when physically moving. The emotional center is designated when the individual is happiest when feeling through emotion. The instinctive center is designated when the individual is happiest when sensing life through the 5 senses. The intellectual center is designated when the individual is happiest when entertaining new concepts. The amount of energy that an individual expends and reserves has a direct impact on many facets of life.

Embodiments of the invention utilize a questionnaire or survey that presents numerous questions that are directed toward style, alchemy, features, energy centers, polarity and activity. The system accepts inputs for each question and generates at least one style, alchemy, feature (key and co-feature), energy center, polarity and activity values. In addition, a photograph may be uploaded for use in generating or verify style characteristics of an individual. Embodiments of the invention may utilize image analysis to determine for example if a man has a threshold amount of facial hair, a round face, sparkling eyes, or any other facial feature that allows for the determination of a style. These values may be utilized for self understanding or behavior modification of an individual when used without reference to another individual. By querying two individuals, adding the points associated with each category and determining what values are above preset thresholds for example, and comparing the results of style, activity, polarity and alchemy type, key feature and energy center a compatibility score is generated. The compatibility score determines how compatible two people are to one another and/or what may be done to maintain the relationship in a healthy natural manner as it applies to the methodology.

Embodiments of the invention may be utilized for profiling applications in homeland security, employment or employee relationship management, human resources, recruiting, education and singles matching or in any other endeavor.

BRIEF DESCRIPTION OF THE DRAWINGS

The above and other aspects, features and advantages of the invention will be more apparent from the following more particular description thereof, presented in conjunction with the following drawings wherein:

FIG. 3 is an energy center diagram utilized in embodiments of the invention.

FIG. 6 shows an embodiment of a questionnaire or survey result.

DETAILED DESCRIPTION

A system and method for human physical and behavioral profiling will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
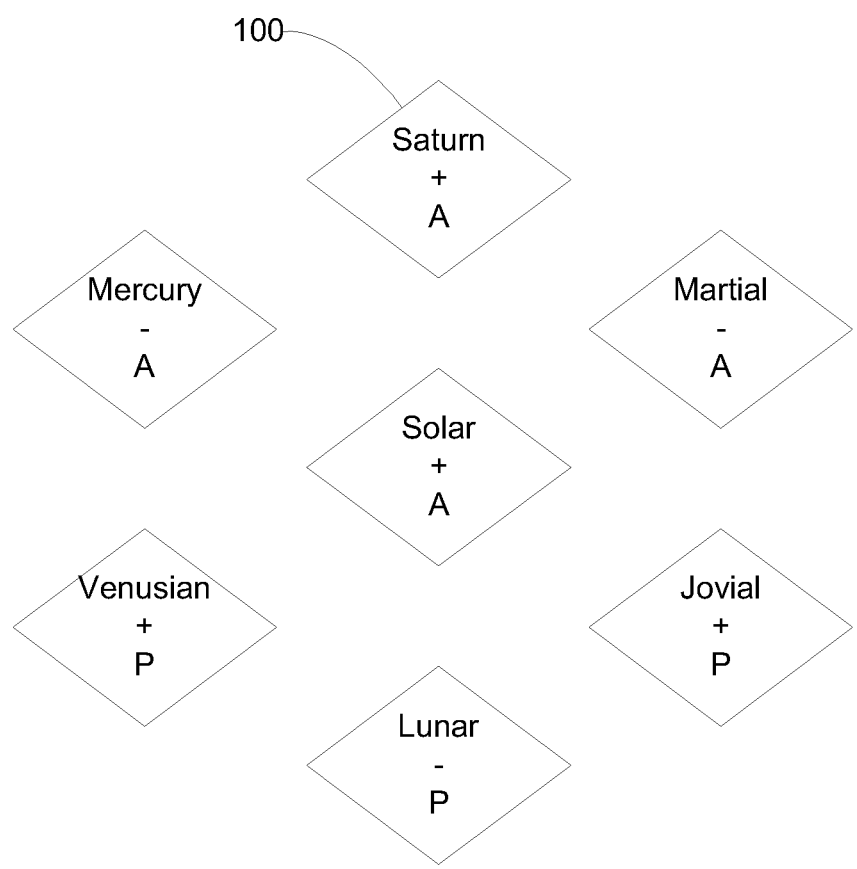
FIG. 1 is a wheel of nature, which is also known as the wheel of life chart of the seven personal styles that are utilized in embodiments of the invention.

FIG. 1 is a wheel of nature chart of the seven personal styles that are utilized in embodiments of the invention. Embodiments of the invention categorize an individual into seven styles, "Saturn", "Mars", "Jovial", "Lunar", "Venusian", "Mercury" and "Solar" based on querying an individual. These styles may be combined to form an overall style that includes percentages of at least one of these types. The following table gives general characteristics associated with each style including the activity values and polarity generally associated with each style.

| STYLE | Activity/Polarity | DESCRIPTION |
| --- | --- | --- |
| SATURN (SA) | Active + | Regal |
| | | Random Coloring |
| | | Tall, or seems taller |
| MARTIAL (MA) | Active − | Energetic |
| | | Chiseled Features |
| | | Golden/Reddish coloring |
| JOVIAL (JO) | Passive + | Absorptive |
| | | Early Male Baldness |
| | | Full Figured |
| LUNAR (LU) | Passive − | Romantic |
| | | Opaque Light Skin |
| | | Weak Chin |
| VENUSIAN (VEN) | Passive + | Sympathetic |
| | | Very Hairy |
| | | Dark Hair |
| MERCURY (MER) | Active − | Perceptive |
| | | Wirey, Dark |
| | | Sharp Pointed |
| SOLAR (SO) | Active + | Effervescent |
| | | Twinkle Eyes |
| | | Fragile Build |

In FIG. 1, for example, an individual may be of type 100, e.g., Saturn. The styles may be chosen by visual input or physical descriptions of an individual for example. Each style may be associated with the polarity values of "active", "passive", "+" or "−". These polarity values are utilized to designate the attraction and repulsion of the person. Saturn types are tall or appear taller than they are. Martial types have well defined bone structures and very square jaws. Jovial types are thirsty for knowledge and usually display greater girth around the waiste/trunk. Lunar types generally have a round face and little or no chin. Venusian types generally are hairy and darker skinned. Mercury types have small and dark eyes. Solar types have eyes that twinkle for example. By querying the user for their physical appearance or utilizing a photograph and visually analyzing the photograph the individual's personal style may be determined. In one or more embodiments of the invention, querying a user with a series of questions that determine the physical makeup of an individual allows for answers to be scored which allows styles to be assigned points. A style may for example be assigned a value of 0 through 10 in one embodiment and the style with the most points is the primary style associated with an individual. For example, a set of questions that are answered with points associated with each answer allows for the determination of a style type. A threshold may be utilized to allow an individual to obtain multiple styles as well. By adding up the polarities for the top three styles associated with the physical appearance of an individual, an overall passive/active and positive/negative indication may be generated. The most compatible people lie on opposite sides of FIG. 1. The most incompatible types lay parallel or two styles away in a rotational sense in FIG. 1. A comparison between individual test results may utilize these parallel or two styles away styles to determine compatibility. In one or more embodiments, results of questions with over 5 points may be utilized to associate one or more styles with an individual. An example set of questions is found at the end of this section.

Figure 2:
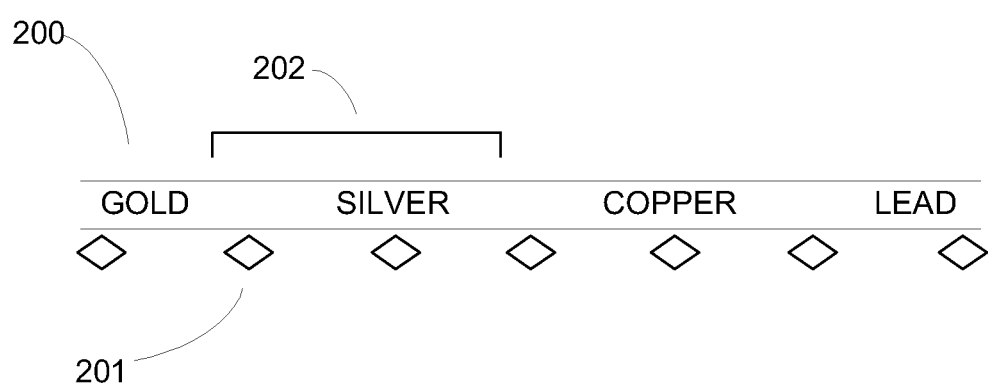
FIG. 2 is a alchemy compatibility range utilized in embodiments of the invention.

FIG. 2 shows visual compatibility range 200 utilized in embodiments of the invention. The system also generates an alchemy type of "Gold", "Silver", "Copper" and "Lead" which further allows for a compatibility checking between people that utilize embodiments of the invention. Intermediate types 201 are also generated when a type is between two types. Compatibility range 202 shows a range of compatibility that may be set to any value that allows for compatible individuals to match. In one or more embodiments of the invention, a range of one unit may be utilized. Gold alchemy types are generally very fussy, meticulous, inflexible and highly refined. Silver alchemy types are neat, flexible, practical, solid, durable and adaptable. Copper alchemy types are tough, coarse, rugged and primitive. Lead alchemy types are messy, smelly, simple and financially poor. Incompatibility between two individuals is largely due to different alchemy types. An alchemy type may be determined by determining how messy, rugged, flexible and meticulous a person is through a series of questions presented by an embodiment of the system. Designations of "Gold", "Gold & Silver", etc., allow for designations that are on or between borders of the four alchemic types described herein. Each person may have a compatibility range that differs in width. If two alchemic types overlap then the two types are most likely compatible. By querying an individual for their preferences, the alchemy type may be determined. A score may be associated with answers that allow for an individuals alchemy type to be tallied. In one embodiment, the score ranges from 0 to 10. A value of over 5 for example may be utilized as a threshold to associate an alchemy type with an individual in one or more embodiments. Any other values for any threshold described herein may be utilized in other embodiments of the invention. Questions may be directed to determine the range of compatibility or how wide on the alchemy scale a compatibility exists for a given individual as well. Even if the style, energy center and key features align, an out of range alchemy typing will generally result in an incompatibility between two individuals.

In one or more embodiments the width of polarity compatibility range may be set to the summation of the absolute value of total positive and total negative polarity. Questions that relate to style for example may be added to gather a positive polarity and negative polarity summation for an individual. For example if a woman has 26 positive and 5 negative units, then a width of two times 31 may be utilized as centered on the difference value, i.e., 21. To determine if there is compatibility, for example with a man that has 17 total positive and 6 total negative units, which results in a range of −12 to +34, i.e., a range centered on 11 that is 46 units wide, then the two ranges may be overlaid to determine how much of the range overlaps.

Furthermore, the system generates a key feature and co-feature for an individual from the features "vanity", "dominance", "power", "greed", "self pity", "fear", "non-existence", "naivete", "destructive", "lunatic", "tramp", and "willfulness" based on querying an individual. The key feature is the main feature of an individual and the co-feature is the relief feature that comes to the forefront when the main feature is not being asserted. By querying an individual for their particular actions taken in certain situations, features may be associated with the individual. In one embodiment a series of questions are directed at determining the feature characteristics of an individual and result in a score for each feature of 0 to 4. The highest value of which is the key feature for example. Each feature has the following strengths and weaknesses:

| FEATURE | STRENGTH + | WEAKNESS − |
|---|---|---|
| vanity | aesthetic sensibility | self-absorbed |
| dominance | creates order | manipulative |
| power | accomplishment | intimidation |
| greed | monetary discernment | gluttonous |
| self pity | compassionate | whining |
| fear | creates protection | creates panic |
| non-existence | humility | neglect |
| naivete | optimistic | immature |
| destructive | initiates change | violence |
| lunatic | spontaneity | manic |
| tramp | detached | deprivation |
| willfulness | persevering | stubborn |

If the top two key features align, there is a good chance of compatibility, any other method of correlating key features to determine a compatibility match is in keeping with the spirit of the invention. This includes assigning values to the key features and adding the matching values up between two individuals in one or more embodiments of the invention. In other embodiments of the invention, key features that may not be compatible may yield incompatible results altogether or percentage probabilities of incompatible matches for example. Any other method of utilizing the key features to determine compatibility is in keeping with the spirit of the invention. If the styles that a user displays (which have associated standard features), do not agree with the observed features, then there may be a substance abuse issue that warrants the suggestion of behavior modification to an individual.

FIG. 3 shows energy center diagram 300 as utilized in embodiments of the invention. Energy center diagram 300 shows the results of an individual that is balanced in all four energy centers which is rare. Energy center diagram 301 shows an energy center diagram for an emotional centered individual. Embodiments of the invention generate an energy center designation of "moving", "emotional", "instinctive" or "intellectual" for an individual based on queries answered by the individual. The moving center is designated when the individual is happiest when physically moving. The emotional center is designated when the individual is happiest when feeling through emotion. The instinctive center is designated when the individual is happiest when sensing life through the 5 senses. The intellectual center is designated when the individual is happiest when entertaining new concepts. The center of energy determines what we are likely to excel at. For example, moving center individuals excel at running, biking, dancing and other sports. Instinctive center individuals excel at cooking, healing arts, massage and gardening for example. Intellectual center individuals excel at law, writing, math, science and other academic endeavors. Emotional center individuals excel at teaching, parenting, negotiating and public relations for example. By querying an individual to determine their activity preferences, the energy center of the individual may be generated. By comparing two energy center readings based on querying two individuals, a compatibility may be generated in one or more embodiments of the invention. In one or more embodiments, descriptions of the two highest centers may be provided to an individual after a test.

Figure 4:
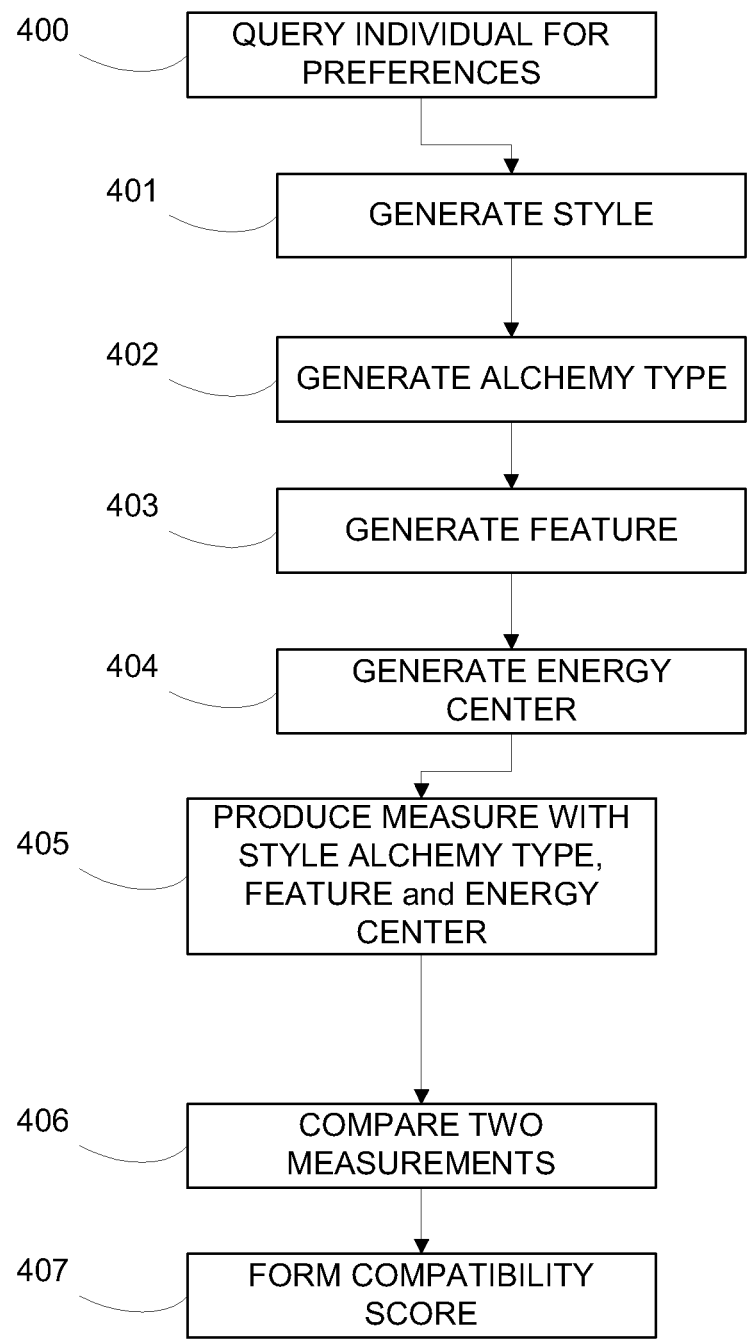
FIG. 4 is a flowchart of a method utilized in an embodiment of the invention.

FIG. 4 is a flowchart of a method utilized in an embodiment of the invention. An individual is queried for preferences at 400. The query may be performed by randomly asking questions that pertain to style, alchemy type, feature and energy center in any order. (See the bottom portion of this section immediately preceding the claims for embodiments of male/female questions for style and questions related to features, energy centers, alchemy). Any question that is utilized to gather information related to physical characteristics may be utilized in generating a style at 401 for an individual for example. Likewise, generation of alchemy type at 402, feature at 403 and energy center at 404 may be accomplished by querying the user for particular preferences, characteristics and activity preferences as well. Any question that generates a component of a measure that utilizes these values is in keeping with the spirit of the invention. A measure is produced at 405 that includes the style, alchemy type, feature and energy center associated with an individual. The style, alchemy type, feature and energy center of an individual is thus generated.

In one or more embodiments of the invention, if the resulting feature values do not correspond closely to a standard type based on the style most associated with the physical characteristics of an individual, then there may be a substance abuse problem that is allowing a co-feature to be asserted. In this case, behavior modification may be suggested using embodiments of the invention. In this case, since there may be only one individual to assess, the process may stop at 405. For embodiments that are utilized for comparing two or more individuals, processing continues at 406. See FIG. 9 for a description of determining whether a secondary feature is being asserted.

For compatibility testing, another individual is tested and then the two measurements are compared at 406. Any type of comparison is in keeping with the spirit of the invention including rule based, logic based, probability based or neural network based comparisons. The compatibility score is generated at 407. The score may include binary or real number values so long as the compatibility is quantified based on the style, alchemy type, feature and energy center of the two individuals. Hence, by querying two individuals and comparing the results of style, activity, polarity and alchemy type, key feature and energy center a compatibility score is generated that determines how compatible two people are to one another. Likewise, groups of people such as executives may be compared against one another for compatibility by querying the total number of desired users and comparing the results for example in a spreadsheet program.

Figure 5:
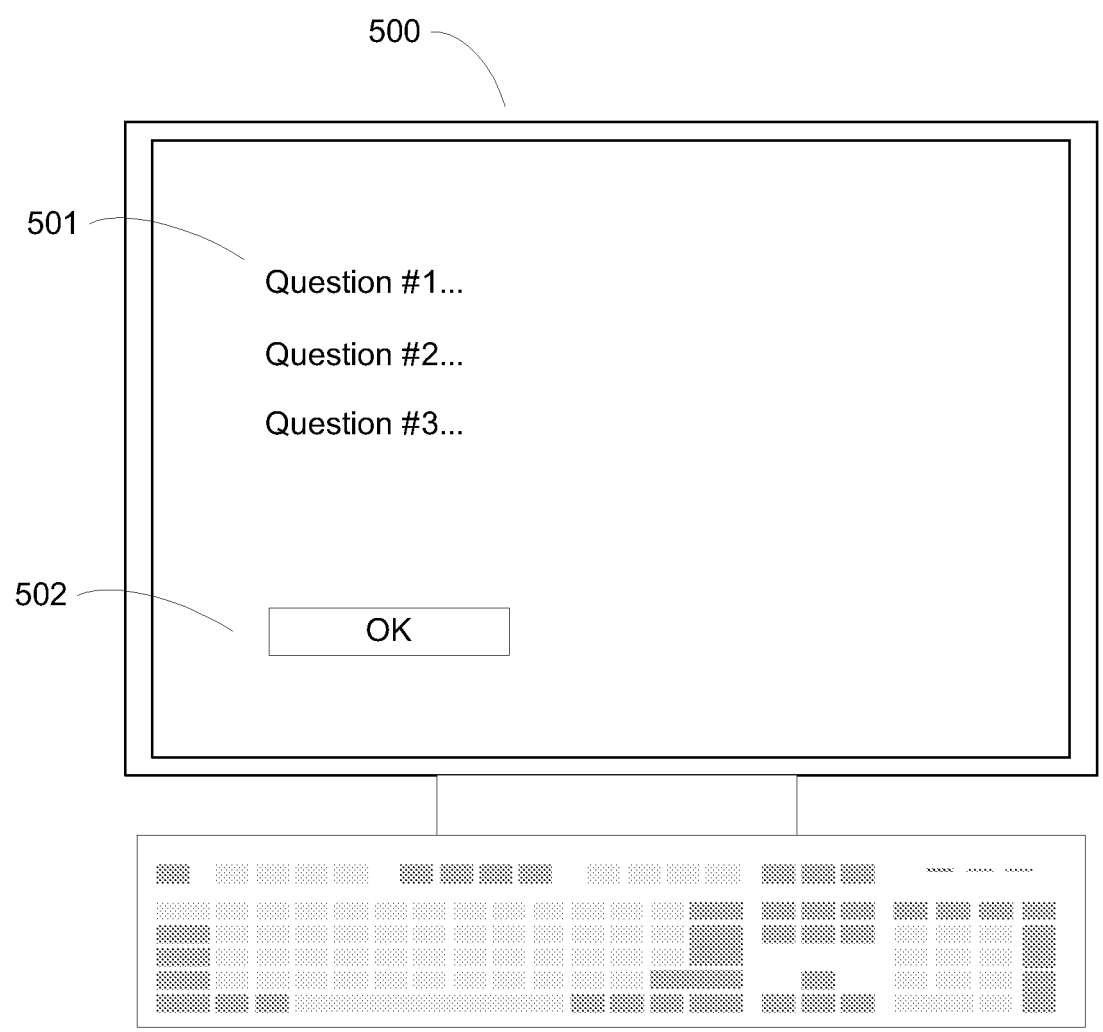
FIG. 5 is an architectural diagram of an embodiment of the invention.

FIG. 5 is an architectural diagram of an embodiment of the invention. Embodiments of the system may include a questionnaire for example that displays questions 501 and accepts user input when at least one question is answered at 502. Computer 500 may also include a web server component so that remote users on remote computers are not required to install any software on their own personal computer besides a browser. Fees may be collected from users for utilizing the system. Fees may also be collected from dating services for use of the system on each comparison, or on each compatibility found for example. Any other method of generating fees through use of the system is in keeping with the spirit of the invention.

FIG. 6 shows an embodiment of a questionnaire result or survey result. Survey result 600 shows scores obtained by querying users for information related to types (styles), features, energy centers, alchemy and polarity. For example someone answering a question related to whether they are hairy or not would contribute to their score related to the Venusian type. The question may be from Yes/No/Sometimes, 0 to 10, or any other scale. The questions related to type, i.e., "style", add into the result associated with the style to form the display of types as shown in the top portion of FIG. 6. Likewise, answers to questions related to features, energy centers, alchemy types are added up to generate the display as shown in FIG. 6. Polarity from each associated style question are likewise added to obtain a total positive and negative polarity value. (See questions at the end of this section for man/woman style questions and feature, energy center and alchemy questions). Any types of questions that allow for the summation of style, features, energy center and alchemy are in keeping with the spirit of the invention.

Figure 9:
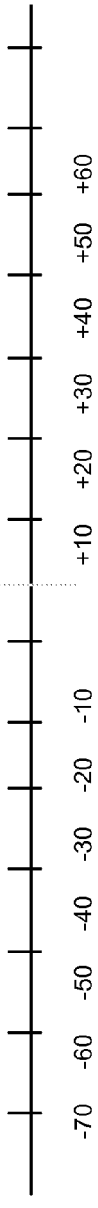
FIG. 9 shows a style, feature, energy center, alchemy presentation screen that shows standard values in addition to the values shown in FIG. 6.

FIG. 9 shows a style, feature, energy center, alchemy presentation screen that shows standard values in addition to the values shown in FIG. 6. In this figure, if the style values in the observed row (immediately beneath the row having "Des", "Dom", "Fe", i.e., abbreviations for the features), differs from the style values for the apparent style of the user (as shown immediately beneath the "Ma" "SaMa" . . . row), then there may be a substance abuse problem that is allowing co-features or other features to be asserted and individual behavior modification may thus be suggested to the individual.

Figure 7:
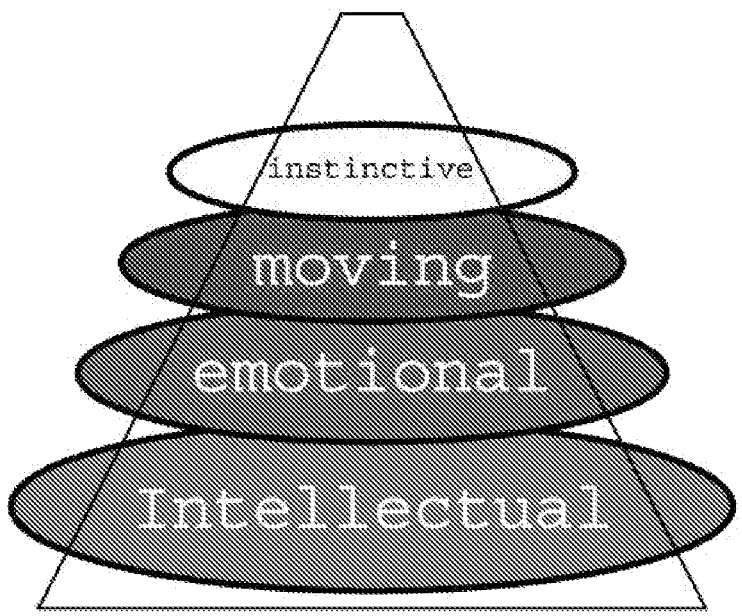
FIG. 7 shows an energy center priority diagram showing an individual having an energy center that is intellectual, emotional, moving and instinctive in that order

FIG. 7 shows an energy center priority diagram showing an individual having an energy center that is intellectual, emotional, moving and instinctive in that order. For example, energy center priority diagram 700 shows that this individual would processing the occurrences in his/her environment by analyzing the surrounds, then the second response would be emotional, then the third response would be to take action, then the last realization would be whether or not the circumstance posed a threat. Also, see FIG. 3 for another view of energy centers. Again, the values of answers associated with questions having to do with energy center are added to produce the resulting energies in the "ENERGIES" section of FIG. 6.

Figure 8:
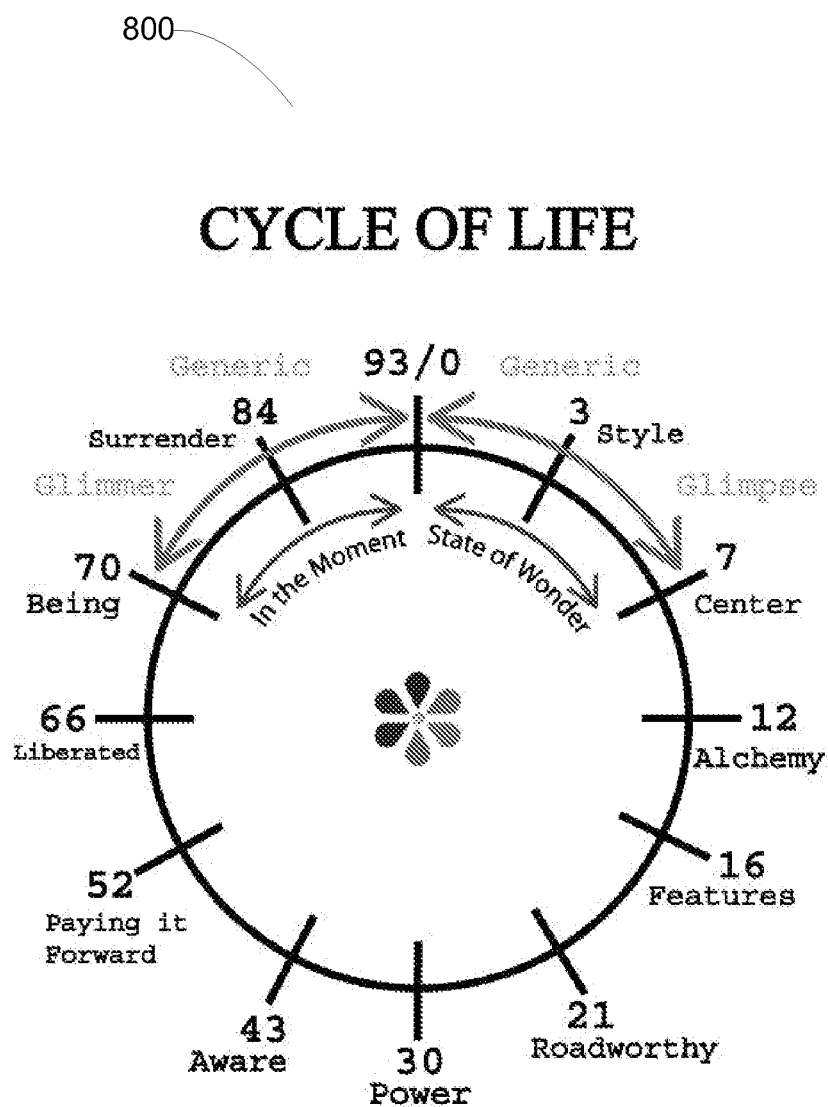
FIG. 8 shows the cycle of life where each of the components utilized in an embodiment of the invention are generally associated with an individual.

FIG. 8 shows the cycle of life where each of the components utilized in an embodiment of the invention are generally associated with an individual. Cycle of life diagram 800 shows that at about age 3, the style or general physical characteristics of an individual come into play. At roughly age 7, the energy center of the individual becomes defined. At age 12 the alchemy type of the individual sets. At age 16 the features of an individual firm. The numbers around the cycle of life wheel are in years.

In each of the following questionnaire embodiments, the choices are shown along with the values that are utilized by the system to generate the respective summation of style, features, alchemy, and energy centers. The values that are generated are not shown during the taking of the questionnaire, rather the values are shown in this manner for ease of understanding the type of questions that may be utilized to form values for style. Any other similar questions that result in the generation of a quantitative measure of style, are in keeping with the spirit of the invention. For example, question 2 below shows possible selections such as "Ivory", "Golden" and "Olive" and the respective values that are utilized in determining style when the system accepts the corresponding input from the user. In this case if a user inputs "Olive" for their skin color, then the system adds +1 to the "Mercury" style and +1 to the "Venusian" style since both of these style may exhibit this characteristic.

Men Test Questions

1) Are you
Man or
Woman?
(for selection of man continue immediately below, for selection of woman go to woman section several pages below)

2) For your nationality, which color most closely resembles your skin color?
Ivory (burns easily) (+1 LUNAR)
Golden (burns but tans quickly thereafter) (+1 MARS and +1 JOVIAL)
Olive (does not burn) (+1 MERCURY and +1 VENUSIAN)

3) What was the hair color closest to your natural hair color before you were 21?
Black (+1 VENUSIAN and +1 MERCURY)
Brown (+1 VENUSIAN and +1 MERCURY)
Blonde (+1 MARS and +1 JOVIAL and +1 SOLAR)
Red (+1 MARS)

4) Which eye color is closest to yours?
Dark BROWN—(+1 VENUSIAN And +1 MERCURY)
BLUE-VIOLET (+1 VENUSIAN and +1 MERCURY)
LIGHT BROWN (+1 VENUSIAN And +1 MERCURY)
GOLDEN BROWN (+1 MARS and +1 JOVIAL)
BLUE (+1 MARS and +1 JOVIAL)
GREEN (+1 MARS and +1 JOVIAL)

5) Are your eyes?
Small (+1 MERCURY) Medium (+0 NOTHING) Large (+1 LUNAR)

6) Do your eyes sparkle?
Yes (+1 SOLAR)
No (+0 NOTHING)

7) Is your face:
Round (+1 JOVIAL and +1 LUNAR and +1 VENUSIAN)
Square (+1 MARS)
Oval with smooth features (+0 NOTHING)
Oval with pointed features (+1 MERCURY)

8) Which is your body shape?
Slim (+1 MERCURY and +1 SOLAR)
Average (+0 NOTHING)
Athletic (+1 MARS and +1 MERCURY)
Full (+1 JOVIAL and +1 VENUSIAN)

9) Are you tall (6'0" or taller)?
Yes (+2 SATURN)
No (+0 NOTHING)

10) Do people see you as taller than you are?
Yes (+1 SATURN and +1 LUNAR)
No (+0 NOTHING)

11) Was your hair thinning before you were 30?
Yes (+1 JOVIAL and +1 LUNAR)
No (+0 NOTHING)

12) Was your waist thick before the age of 30?
Yes (+1 JOVIAL and +1 VENUSIAN)
No (+0 Nothing)

13) Are you naturally hairy?
Yes (+2 VENUSIAN)
No (+0 NOTHING)

14) On a scale of 1 to 8, 1 being positive and 8 being negative, where do you rate yourself?
1 2 3 4 5 6 7 8
1-#2 (+1 SATURN and +! JOVIAL and −1 VENUSIAN)
3-#4 (+0 NOTHING)
5-#8 (+1 MARS and +1 LUNAR and +1 MERCURY)

15) Are you confrontational when provoked?
Yes (+1 MARS and +1 MERCURY)
No (+0 NOTHING)

16) Do you have a childlike voice?
Yes (+1 SOLAR)
No (+0 Nothing)

17) Are you easily distracted?
Yes (+1 SOLAR)
No (+0 Nothing)

18) Are you passive by nature?
Yes (+1 JOVIAL and +1 LUNAR and +1 VENUSIAN)
No (+0 Nothing)

19) Are you an optimist?
Yes (+1 JOVIAL and +1 VENUSIAN and +1 SOLAR)
No (+0 Nothing)

20) Are you active?
Yes (+1 SATURN and +1 MARS and +1 SOLAR)
No (+0 Nothing)

21) Prior to age 30, did/does your chin or jaw line lack definition?
Yes (+1 LUNAR)
No (+0 Nothing)

22) Are you naturally playful?
Yes (+1 SOLAR)
No (+0 Nothing)

23) Are you high waisted?
Yes (+1 LUNAR)
No (+0 Nothing)

24) Do you like shiny things?
Yes (+1 SOLAR)
No (+0 Nothing)

25) Are you aggressive?
Yes (+1 MARS and +1 MERCURY)
No (+0 Nothing)

26) If you were a character in fairy tale, would you want to be:
Monarch or Queen (+1 SATURN)
Knight (+1 MARS)
Advisor to King (+0 NOTHING)
Friar (+0 NOTHING)
Healer (+0 NOTHING)
Legal Counsel (+0 NOTHING)
Jester (+1 SOLAR)

27) Are you frequently volunteered for positions of authority?
Yes (+1 SATURN)
No (+0 Nothing)

28) Are you a micromanager?
Yes (+0 Nothing)
No (+1 SATURN)
Sometimes (+0 nothing)

29) Are you sometimes lazy?
Yes (+1 VENUSIAN)
No (+0 NOTHING)

Women Test Questions

1) Are you
Man or Woman?
(If Man go Back Several Pages to Question 2 for Men, Else Continue Below)

2) For your nationality, which color most closely resembles your skin color?
Ivory (burns easily) (+1 LUNAR)
Golden (burns but tans quickly thereafter) (+1 MARS and +1 JOVIAL)
Olive (does not burn) (+1 MERCURY and +1 VENUSIAN)

3) What was the hair color closest to your natural hair color before you were 21?
   Black (+1 VENUSIAN and +1 MERCURY)
   Brown (+1 VENUSIAN and +1 MERCURY)
   Blonde (+1 MARS and +1 JOVIAL and +1 SOLAR)
   Red (+1 MARS)
4) Which eye color is closest to yours?
   Dark BROWN—(+1 VENUSIAN And +1 MERCURY)
   BLUE-VIOLET (+1 VENUSIAN and +1 MERCURY)
   LIGHT BROWN (+1 VENUSIAN And +1 MERCURY)
   GOLDEN BROWN (+1 MARS and +1 JOVIAL)
   BLUE (+1 MARS and +1 JOVIAL)
   GREEN (+1 MARS and +1 JOVIAL)
5) Are your eyes?
   Small (+1 MERCURY) Medium (+0 NOTHING) Large (+1 LUNAR)
6) Do your eyes sparkle?
   Yes (+1 SOLAR)
   No (+0 NOTHING)
7) Is your face:
   Round (+1 JOVIAL and +1 LUNAR and +1 VENUSIAN)
   Square (+1 MARS)
   Oval with smooth features (+0 NOTHING)
   Oval with pointed features (+1 MERCURY)
8) Which is your body shape?
   Slim (+1 MERCURY and +1 SOLAR)
   Average (+0 NOTHING)
   Athletic (+1 MARS and +1 MERCURY)
   Full (+1 JOVIAL and +1 VENUSIAN)
9) Are you tall (5'7" or taller)?
   Yes (+2 SATURN)
   No (+0 NOTHING)
10) Do people see you as taller than you are?
   Yes (+1 SATURN and +1 LUNAR)
   No (+0 NOTHING)
11) Are you naturally busty?
   Yes (+1 JOVIAL and +1 VENUSIAN)
   No (+0 NOTHING)
12) Are you hippy?
   Yes (+1 JOVIAL and +1 VENUSIAN)
   No (+0 NOTHING)
13) Are you naturally hairy?
   Yes (+1 VENUSIAN)
   No (+0 NOTHING)
14) On a scale of 1 to 8, 1 being positive and 8 being negative, where do you rate yourself?
   1 2 3 4 5 6 7 8
   #1-#2 (+1 SATURN and +! JOVIAL and −1 VENUSIAN)
   #3-#4 (+0 NOTHING)
   #5-#8 (+1 MARS and +1 LUNAR and +1 MERCURY)
15) Are you confrontational when provoked?
   Yes (+1 MARS and +1 MERCURY)
   No (+0 NOTHING)
16) Do you have a childlike voice?
   Yes (+1 SOLAR)
   No (+0 Nothing)
17) Are you easily distracted?
   Yes (+1 SOLAR)
   No (+0 Nothing)
18) Are you passive by nature?
   Yes (+1 JOVIAL and +1 LUNAR and +1 VENUSIAN)
   No (+0 Nothing)
19) Are you an optimist?
   Yes (+1 SATURN and +1 JOVIAL and +1 VENUSIAN and +1 SOLAR)
   No (+0 Nothing)
20) Are you active?
   Yes (+1 SATURN and +1 MERCURY and +1 MARS and +1 SOLAR)
   No (+0 Nothing)
21) Prior to age 30, did/does your chin or jaw line lack definition?
   Yes (+1 LUNAR)
   No (+0 Nothing)
22) Are you naturally playful?
   Yes (+1 SOLAR)
   No (+0 Nothing)
23) Are you high waisted?
   Yes (+1 LUNAR)
   No (+0 Nothing)
24) Do you like shiny things?
   Yes (+1 SOLAR)
   No (+0 Nothing)
25) Are you aggressive?
   Yes (+1 MARS and +1 MERCURY)
   No (+0 Nothing)
26) If you were a character in fairy tale, would you want to be:
   Monarch or Queen (+1 SATURN)
   Knight (+1 MARS)
   Advisor to King (+0 NOTHING)
   Friar (+1 LUNAR)
   Healer (+0 NOTHING)
   Legal Counsel (+0 NOTHING)
   Jester (+1 SOLAR)
27) Are you frequently volunteered for positions of authority?
   Yes (+1 SATURN)
   No (+0 Nothing)
28) Are you a micromanager?
   Yes (+0 Nothing)
   No (+1 SATURN)
   Sometimes (+0 nothing)

Regardless of whether a man or woman has completed their respective questions above, the following questions are answered by both men and women to generate their feature, energy and alchemy types. In the questions below, the possible selection is also shown along with the quantity that the question is directed towards (even though this value is not shown to the users while taking the questionnaire). The value is shown for ease of understanding the various quantities that are utilized to present the summary of the individual's features, energy centers and alchemy types. The associated value for some answers below lies on the side of a Yes or No. For example, if the response is next to Yes, then the value (generally in parenthesis) is utilized to generate the individuals score if the individual selects Yes, otherwise no value is utilized. E.g., "(vanity) Yes No" signifies that if the user selects Yes, then the vanity score is increased for an individual. Any other questions that generate indications as to the features, energy centers or alchemy of an individual are in keeping with the spirit of the invention.

Features, Energy Centers and Alchemy Questions
33) Are you afraid of life? (traffic, airplanes, germs)
   No Yes (Fear)
34) Is a beautiful environment important to you?
   (vanity) Yes No
35) Is it important to you to create order in your home or work place?
   (Dom) Yes No
36) Are you very apologetic?
   (Self pity) Yes No
37) Are you stubborn?
   (willfull) Yes No 38) Are you an instigator?
(Destrct) Yes No sometimes=yes
39) Are you gullible?
(Naivete) Yes No
40) Have you ever gone unnoticed at a party?
(Non-ex) Yes No sometimes=yes
41) Are your moods unpredictable?
(Lunatic) Yes No
42) Do you share?
Yes No (Greed)
43) Is money important to you?
(greed) Yes No sometimes=yes
44) Are you always concerned about your appearance when you leave the house?
(Vanity) Yes No
45) Do you find it easy to detach?
(tramp) Yes No
46) Do you avoid commitments?
(Tramp) Yes No
47) Do you stay on task?
(Willfull) Yes No
48) Do you like to tear things down?
(Destruct) Yes No
49) Do you like to blow things up?
(Destruct) Yes No
50) Does life often seem hopeless?
(Self pity) Yes No
51) Do we need more laws to protect us?
(Fear) Yes No
52) Are you a daydreamer?
(Non ex) Yes No
53) Are you young at heart?
(Naviete) Yes No
54) Do you agonize over things?
(Lunatic) Yes No
55) Do you delegate authority?
(dominance) Yes No
56) Do you think you are always right?
(Power) Yes No
57) Do you like to get up in front of people?
(Vanity) Yes No
58) Do you over-buy?
(Greed) Yes No
59) Is it difficult for you to make decisions?
(Tramp) Yes No
60) Does change bother you?
Yes No (Willful)
61) Are you extremely compassionate?
(Self pity) Yes No sometimes=yes
62) Are you afraid of war, famine or poverty?
(Fear) Yes No
63) Do you require acknowledgement for good deeds?
Yes No (NON-EX)
64) Do others perceive you as childlike?
(NAIVETE) Yes No
65) Do you get depressed easily?
(LUNATIC) Yes No
66) Do you like to debate, argue or fight?
(DESTRUCT) Yes No
67) Do you often look in the mirror at yourself?
(VANITY) Yes No
68) Do you always desire more?
(GREED) Yes No
69) Is life wonderful?
(NAVIETE) Yes No
70) Do you cling to people?
(SELF PITY) Yes No 71) Do you feel safe in the world?
(Fear) Yes No
72) Do you require attention?
Yes No (NON-EX) sometimes=yes
73) Do you worry that people think you are crazy?
(LUNATIC) Yes No
74) Do you need to win?
(POWER) Yes No
75) Are you relentless in your pursuits?
(WILLFUL) Yes No
76) Do you focus on the big picture?
(DOMINANCE) Yes No
77) DO YOU FREQUENTLY USE INTIMIDATION TO TAKE CONTROL?
(POWER) Yes No
78) ARE YOU LOYAL?
YES NO (TRAMP)
79) When you are in charge of others, do you regard them as:
(DOM) Under your direction
(POWER) At your disposal
(NOTHING) An inspiration
(NOTHING) As companionship
80) What is your favorite jewelry to wear?
(G) Gold/PLATINUM, WHITE OR YELLOW
(S) Silver
(C) Copper
81) When traveling, which hotel do you prefer to stay in?
(S) Courtyard by Marriott
(G) Ritz Carlton
(C) Motel 6
82) Is HAVING YOUR BED MADE EACH MORNING
(G) Important
(S) Somewhat Important
(C) Not Important
83) Are you
(C) Not Organized
(S) Somewhat Organized
(G) Very Organized
84) How often do you shower?
(G) Twice a Day
(S) Once a Day
(C) Every Other Day
85) How often IS YOUR CAR WASHED?
(G) Once a Week
(S) Once a Month
(C) After someone writes "Wash Me" on it
6) IF YOU WERE LIVING ALONE HOW MANY OF YOUR CLOTHES WOULD GET IRONED?
(G) Most
(S) Some
(C) None
Please rank the following in order from most favorite (1) to least favorite (4):
87) Given the choice would you rather
(INT) read a book
(MOVE) do something active
(INST) relax in a jacuzzi
(EMOT) dine with friends
88) When purchasing a new car, what do you look for
(INT) reliability
(INST) the way it looks
(EMOT) seating capacity
(MOVE) driving experience
89) Which best describes you?
(INST) You love to listen to music
(INT) You love to contemplate (MOVE) You love to move
(EMOT) You love to socialize
90) When selecting a movie, please rank the following in order
(INST) drama
(EMOT) comedy
(INT) documentary or art film
(MOVE) action While the invention herein disclosed has been described by means of specific embodiments and applications thereof, numerous modifications and variations could be made thereto by those skilled in the art without departing from the scope of the invention set forth in the claims.

What is claimed is:

1. A method for human physical and behavioral profiling comprising:
    querying an individual by displaying questions on a computer screen coupled with a computer that is specifically configured to query said first individual about a plurality of categories with
        at least one question associated with style corresponding to a first category of said plurality of categories,
            wherein said at least one question associated with said style comprises a question related to a physical characteristic of said first individual that includes whether said first individual is tall, full-figured, weak chinned, dark haired, wirey, fragile or whether said first individual has twinkly eyes;
        at least one question associated with feature corresponding to a second category of said plurality of categories,
            wherein said at least one question associated with said feature comprises a question related to motivations of said first individual,
        at least one question associated with energy center corresponding to a third category of said plurality of categories,
            wherein said at least one question associated with said energy center comprises a question related to what behavior makes said first individual happiest, and
        at least one question associated with alchemy corresponding to a fourth category of said plurality of categories,
            wherein said at least one question associated with said alchemy comprises a question related to preferences of said first individual toward oneself or others;
    obtaining at least one answer from each of said at least one question related to style, feature, energy center and alchemy in response to said query,
        wherein said first individual comprises standard features based on said style most associated with said physical characteristic of said first individual;
    generating at least one value from each of said at least one answer for each of said plurality of categories;
    assigning at least one point associated with each of said at least one value from each of said at least one answer for each of said plurality of categories;
    summing all values and all points from said at least one value and said at least one point for each of said plurality of categories, with said computer, wherein said all values and said all points are associated with said at least one answer associated with said style, feature, energy center and alchemy;
    generating a first measurement, with said computer, for a first individual based on said sum of said all values and said all points, wherein said measurement comprises at least one style, at least one feature, an alchemy type, and an energy center;
    wherein if a feature value generated from said at least one answer for said question associated with feature does not agree with said standard features based on said style most associated with said physical characteristic of said first individual, suggesting behavior modification;
    querying a second individual about said plurality of categories in an identical manner to said first individual and performing said generating at least one value, said assigning, said summing, and generating a second measurement for said second individual; and,
    comparing said first measurement and said second measurement and forming a compatibility score from said comparison.

2. The method for human physical and behavioral profiling of claim 1 wherein said querying said first individual and said second individual with said question related to preferences of said individual toward oneself or others comprises querying said individual with a question related to whether said individual is fussy, meticulous, inflexible, highly refined, neat, flexible, practical, solid, durable, adaptable, tough, coarse, rugged, primitive, messy, smelly, simple or poor.

3. The method for human physical and behavioral profiling of claim 1 wherein said querying said first individual and said second individual with said question related to said motivation of said individual comprises querying said individual with a question related to whether said individual displays vanity, dominance, power, greed, self pity, fear, non-existence, naivete, destructive, lunatic, tramp, or willfulness.

4. The method for human physical and behavioral profiling of claim 1 wherein said querying said first individual and said second individual with said question related to said behavior that makes said individual happiest comprises querying said individual with a question related to whether said individual is happiest when physically moving, or when said individual is happiest when feeling through emotion, or when said individual is happiest when sensing life through senses of said individual or when said user is happiest when entertaining new concepts.

5. The method for human physical and behavioral profiling of claim 1 further comprising determining for each of said values which values are above preset thresholds.

6. The method for human physical and behavioral profiling of claim 1 wherein said method is utilized for profiling applications in at least one of homeland security, employment or employee relationship management, human resources, recruiting, education, singles matching, or any combination thereof.

7. The method for human physical and behavioral profiling of claim 1 further comprising determining a range of compatibility for each of said plurality of categories for each of said first individual and said second individual, wherein each of said first individual and said second individual comprise a compatibility range that differs in width.

8. The method for human physical and behavioral profiling of claim 7 wherein if an alchemy value of said first individual or said second individual is out of said range, determining incompatibility between said first individual and said second individual.

9. The method for human physical and behavioral profiling of claim 1 wherein from said at least one answer related to feature, quantifying a key feature and a co-feature for said first individual.

10. A method for human physical and behavioral profiling comprising:

querying an individual by displaying questions on a computer screen coupled with a computer that is specifically configured to query said first individual about a plurality of categories with
- at least one question associated with style corresponding to a first category of said plurality of categories,
  - wherein said at least one question associated with said style comprises a question related to a physical characteristic of said first individual that includes whether said first individual is tall, full-figured, weak chinned, dark haired, wirey, fragile or whether said first individual has twinkly eyes;
- at least one question associated with feature corresponding to a second category of said plurality of categories,
  - wherein said at least one question associated with said feature comprises a question related to motivations of said first individual,
- at least one question associated with energy center corresponding to a third category of said plurality of categories,
  - wherein said at least one question associated with said energy center comprises a question related to what behavior makes said first individual happiest, and
- at least one question associated with alchemy corresponding to a fourth category of said plurality of categories,
  - wherein said at least one question associated with said alchemy comprises a question related to preferences of said first individual toward oneself or others;

obtaining at least one answer from each of said at least one question related to style, feature, energy center and alchemy in response to said query,
- wherein said first individual comprises standard features based on said style most associated with said physical characteristic of said first individual, and
- wherein from said at least one answer related to feature, quantifying a key feature and a co-feature for said first individual;

generating at least one value from each of said at least one answer for each of said plurality of categories;

assigning at least one point associated with each of said at least one value from each of said at least one answer for each of said plurality of categories;

summing all values and all points from said at least one value and said at least one point for each of said plurality of categories, with said computer, wherein said all values and said all points are associated with said at least one answer associated with said style, key feature, co-feature, energy center and alchemy;

generating a first measurement, with said computer, for a first individual based on said sum of said all values and said all points, wherein said measurement comprises at least one style, at least one feature, an alchemy type, and an energy center;

wherein if a feature value generated from said at least one answer for said question associated with feature does not agree with said standard features based on said style most associated with said physical characteristic of said first individual, suggesting behavior modification;

querying a second individual about said plurality of categories in an identical manner to said first individual and performing said generating at least one value, said assigning, said summing, and generating a second measurement for said second individual; and, comparing said first measurement and said second measurement and forming a compatibility score from said comparison.

* * * * *